Patented July 16, 1946

2,404,200

UNITED STATES PATENT OFFICE 2,404,200

2-(4-SUCCINYL-AMINO-BENZENE-SULPHONAMIDO)-QUINOXALINE

John Weijlard, Westfield, and Max Tishler, Rahway, N. J., assignors to Merck & Co., Inc., Rahway, N. J., a corporation of New Jersey No Drawing. Application September 7, 1944, Serial No. 553,104

1 Claim. (Cl. 260—239.6)

This invention, in its more general aspects, relates to therapeutically useful chemical compounds and methods of preparing the same; more specifically, it is concerned with certain novel sulpha drugs and processes for their manufacture.

This application is a continuation-in-part of a copending application filed by the same applicants on January 8, 1944, Serial No. 517,560, entitled "Chemical compounds and processes of preparing the same."

Although it is possible for a skilled chemist, knowing certain physical properties and the behavior of a substance toward various chemical reagents, to predict with reasonable accuracy corresponding physical properties and probable chemical reactivity of substances, such as homologs, related to the known compound, it is not generally possible for even an experienced worker to predict the physiological activity of chemical compounds. For example, certain of the vitamins are highly specific in physiological activity and changes in molecular structure that produce little difference in physical properties or chemical reactivity cause extreme differences in physiological activity. In vitamin $B_1$, when the amino-group of the amino-pyrimidine moiety is replaced by a hydroxyl group, the characteristic physiological activity is destroyed; dihydro-vitamin $B_1$ is inactive although dihydro-cocarboxylase is active. When in vitamin $B_1$, the methyl group occupying the 2-position in the pyrimidine moiety is shifted to the 6-position the second compound possesses but a small fraction of the activity of the first. Vitamin $B_2$, riboflavin, when alkylated in the 3-position, loses entirely its characteristic activity. Vitamin $B_6$ benzoate is inactive although the di- and tri-acetate of the vitamin are fully active; the methyl-ether of the vitamin possesses but $1/500$ of the activity of the vitamin. Dextro-rotatory antothenic acid is fully active; the laevorotatory isomer is inactive. The acetate, benzoate and diphosphate of pantothenic acid are inactive. Dihydro-ascorbic acid is inactive; dehydro-ascorbic acid is fully active.

Following the discovery of the remarkable bacteriostatic properties of p-amino-benzene-sulphonamide, various related compounds have been tested as therapeutic agents and it has been found that certain are valuable in treating specific diseases. For example sulphanilamide is particularly useful in treating conditions due to hemolytic streptococcic infections; sulphapyridine in treating peneumonia and gonorrhea; sulphathiazole and sulphadiazine in treating pneumonia, gonorrhea, E. coli and staphylococcic infections; sulphaguanidine in bacillary dysentery; and succinylsulphathiazole in treating diseases limited to the gastro-intestinal tract. However, because of the impossibility of predicting physiological activity of a particular compound merely upon the basis of known activity of a related or similar compound, it has been necessary, in developing new sulpha compounds, to test in vivo the chemical substance concerned.

It is noteworthy, in this connection, that certain sulpha-monocyclic compounds display high activity although corresponding sulpha-bicyclic compounds are merely slightly active. For instance, sulphathiazole (Formula A) is highly active as above mentioned, but sulphabenzothiazole (Formula B) has only slight bacteriostatic activity; likewise sulphapyridine (Formula C) is active but sulphaquinoline (Formula D) is relatively inactive.

Formula A

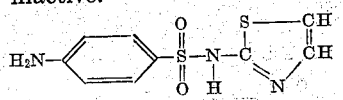

Formula B

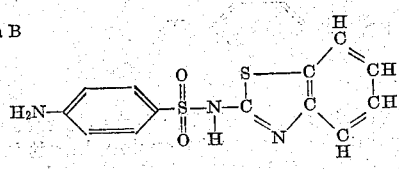

Formula C

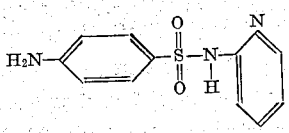

Formula D

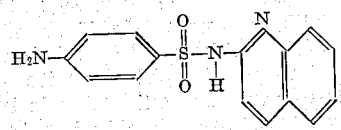

It is now found by the present inventors that a new sulpha-compound, 2-(4-amino-benzene-sulphonamide)-quinoxaline, having the structural formula

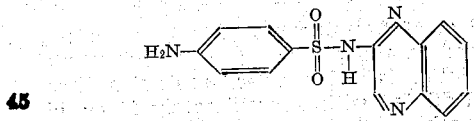

possesses valuable and unusual therapeutic utility. It is remarkable and unexpected in view of the relative inactivity of the bicyclic sulpha compounds above mentioned, that this new material is physiologically more active than its monocyclic analog, 2-(4-amino-benzene-sulphonamido)-pyrazine. Another remarkable and unpredictable property of this new substance is that it is less rapidly excreted by the organism under treatment than are other sulpha-compounds, thus in the treatment of pneumococcic, staphylococcic and similar infections, a satisfactory bacteriostatic concentration of the compound can be maintained using a lower rate of administration than is required with other sulpha-drugs. For example, an adequate blood level of the new compound is attained when it is administered at intervals of twenty-four to forty-eight hours, whereas other sulpha-drugs, in the same dosage, must be administered at intervals of four to six hours to maintain corresponding levels.

In accordance with the present invention, this new compound can be synthesized by reactions indicated as follows:

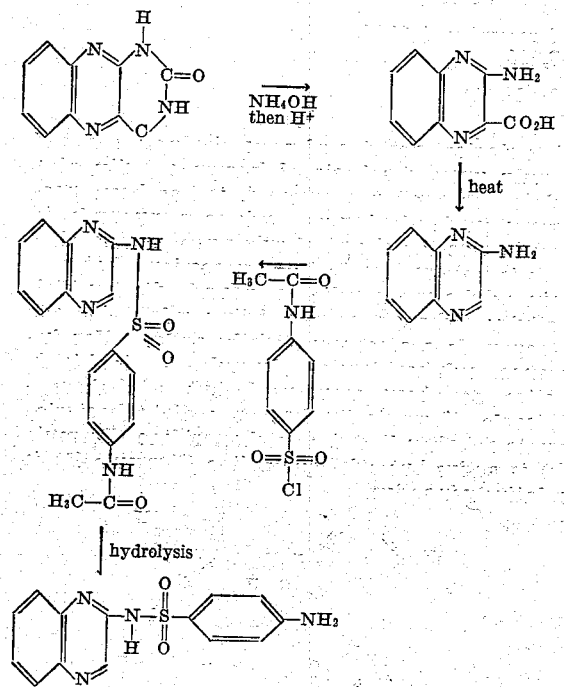

The following example illustrates a method of carrying out the present invention, but it is to be understood that this example is given by way of illustration and not of limitation.

EXAMPLE

Synthesis of 2-amino-3-carboxy-quinoxaline

About 10 g. of alloxazine (Ber., 24, 2363 (1891)) are mixed with approximately 50 cc. of concentrated ammonia and heated in a bomb at 165° C. for about 10 hours. After dilution with water and removal of ammonia by boiling, decolorizing with charcoal and filtering, hydrochloric acid is added until the mixture is of pH 2.5. Upon cooling, 2-amino-3-carboxy-quinoxaline separates as crystals (M. P. 204° C.).

Synthesis of 2-amino-quinoxaline

About 2 g. of 2-amino-3-carboxy-quinoxaline are dissolved in about 8 cc. of hot nitrobenzene and the solution is refluxed for 10 minutes, then cooled and diluted with approximately 40 cc. of petroleum ether. The product, 2-amino-quinoxaline, separates as crystals (M. P. 150–151° C.).

Synthesis of 2-(4-acetylamino-benzene-sulphonamido)-quinoxaline

A mixture of about 5 g. of 2-amino-quinoxaline and approximately 8.8 g. of p-acetylamino-benzene-sulphonyl chloride are added in small portions with agitation to about 50 cc. of cold (3°–7° C.) pyridine. The mixture is stirred with cooling, then heated at 45–50° C. for about 2 hours and, after standing, the pyridine is removed by distillation and water is added to the residue. The product, 2-(4-amino-benzene-sulphonamido)-quinoxaline, is obtained as crystals that can be purified by recrystallization from dilute acetic acid (M. P. 244.5–245° C.). By substituting p-benzoylamino-benzene-sulphonyl chloride or p-caproylamino-benzene-sulphonyl chloride for the p-acetylamino-benzene-sulphonyl chloride in the last reaction, 2-(4-benzoylamino-benzene-sulphonamido)-quinoxaline (M. P. 259–260° C.) or 2-(4-caproylamino-benzene-sulphonamido)-quinoxaline (M. P. 150–152° C., initially, 199–200° C. after solidification and remelting) respectively can be obtained.

Synthesis of 2-(4-amino-benzene-sulphonamido)-quinoxaline

About 6 g. of crude 2-(4-acetylamino-benzene-sulphonamido)-quinoxaline, 50 cc. of ethanol and 25 cc. of concentrated hydrochloric acid are refluxed for about an hour, then diluted with water, treated with ammonium hydroxide to slight alkalinity and with acetic acid to slight acidity. After cooling the crystals formed are collected, dissolved in about 50 cc. of sodium hydroxide solution, treated with activated charcoal, filtered, and the solution is slightly acidified. The product, 2-(4-amino-benzene-sulphonamido)-quinoxaline, is obtained as crystals (M. P. 249.5–250° C.). The benzoyl or caproyl compounds can also be hydrolyzed by this acid treatment to give the same product or, if preferred, the hydrolysis of any of these acyl derivatives can be performed under basic conditions using aqueous alkali solutions in the usual manner.

Synthesis of 2-(4-succinyl-amino-benzene-sulphonamido)-quinoxaline

About 15 g. (0.15 mol) of succinyl anhydride and approximately 30 g. (0.10 mol) of 2-(4-amino-benzene-sulphonamido)-quinoxaline are dissolved in about 200 cc. of dry pyridine at a temperature of 85–90° C., and the solution is heated at this temperature for approximately 2 hours. After standing at room temperature, the solution is diluted with about a liter of water and 250 cc. of glacial acetic acid are added, causing separation of the product, 2-(4-succinylamino-benzene-sulphonamido)-quinoxaline,

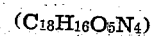

as crystals having a melting point of 234–235° C., which are fully soluble in alkaline aqueous solutions.

Modifications may be made in carrying out the present invention without departing from the spirit and scope thereof and the invention is to be limited only by the appended claim.

What is claimed is:

A compound represented by the formula:

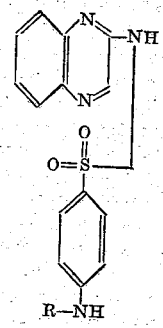

wherein R is a succinyl group.

JOHN WEIJLARD.
MAX TISHLER.